(12) United States Patent
Crews et al.

(10) Patent No.: US 9,637,680 B2
(45) Date of Patent: May 2, 2017

(54) METHOD OF CONTROLLING RESERVOIR PARTICLES USING ELECTROLYTIC COMPOSITE MATERIALS

(71) Applicants: James Crews, Willis, TX (US); Othon R. Monteiro, Houston, TX (US)

(72) Inventors: James Crews, Willis, TX (US); Othon R. Monteiro, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 254 days.

(21) Appl. No.: 13/736,519

(22) Filed: Jan. 8, 2013

(65) Prior Publication Data

US 2013/0175037 A1   Jul. 11, 2013

Related U.S. Application Data

(60) Provisional application No. 61/584,910, filed on Jan. 10, 2012.

(51) Int. Cl.

| | | |
|---|---|---|
| *E21B 43/22* | (2006.01) | |
| *E21B 43/02* | (2006.01) | |
| *E21B 33/138* | (2006.01) | |
| *C09K 8/57* | (2006.01) | |
| *E21B 43/16* | (2006.01) | |
| *C09K 8/504* | (2006.01) | |

(52) U.S. Cl.
CPC .......... *C09K 8/572* (2013.01); *C09K 8/5045* (2013.01); *E21B 33/138* (2013.01); *E21B 43/16* (2013.01); *E21B 43/025* (2013.01)

(58) Field of Classification Search
CPC ......... C09K 8/5045; C09K 8/56; E21B 41/00; E21B 33/13; E21B 33/138; E21B 43/025
USPC ..................................................... 166/305.1
See application file for complete search history.

(56) References Cited

U.S. PATENT DOCUMENTS

| | | | |
|---|---|---|---|
| 4,335,788 A * | 6/1982 | Murphey et al. ............. 166/278 |
| 4,349,386 A | 9/1982 | Davidovits | |
| 5,327,968 A * | 7/1994 | Onan et al. .................. 166/293 |
| 5,836,391 A | 11/1998 | Jonasson et al. | |
| 7,013,973 B2 | 3/2006 | Danican et al. | |
| 7,448,451 B2 | 11/2008 | Nguyen et al. | |
| 7,673,686 B2 | 3/2010 | Nguyen et al. | |
| 7,794,537 B2 | 9/2010 | Barlet-Gouedard et al. | |
| 7,823,642 B2 | 11/2010 | Gadiyar et al. | |
| 8,017,561 B2 | 9/2011 | Nguyen | |
| 2007/0187097 A1 * | 8/2007 | Weaver et al. ............. 166/280.2 |
| 2008/0220995 A1 * | 9/2008 | Huang et al. ................. 507/265 |
| 2009/0038797 A1 * | 2/2009 | Skala ....................... C09K 8/80 166/280.1 |
| 2009/0205830 A1 | 8/2009 | Nguyen et al. | |
| 2011/0136707 A1 * | 6/2011 | Xu ........................... C22C 1/04 507/270 |

OTHER PUBLICATIONS

International Search Report and Written Opinion; International Application No. PCT/US2013/020944; International Filing Date: Jan. 10, 2013; Date of Mailing: Apr. 3, 2013; 10 pages.
A. Palomo et al., "Alkali-activated Fly Ashes: A Cement for the Future," Cement and Concrete Research 29, (1999), 1323-1329.
Geopolymer Institute, [online]; [retrieved Jan. 5, 2012]; retrieved from the internet http://www.geopolymer.org/science/about-geopolymerization, "About geopolymerization," Geopolymer Institute, 1996-2011, 2 pages.
Frantisek Skvara; "Alkali-activated Materials or Geopolymer?"; Cramics-Silikaty 51 (3) 173-177 (2007); Lecture, http://www.geopolymery.eu/aitom/ipload/documents/publikace/2007/2007_03_173.pdf, pp. 173-176.
Concrete Pavement Technology Program, "Geopolymer Concrete"; TechBrief. Mar. 2010; FHWA-HIF-10-014; U.S. Dept of Transportation, Federal Highway Administration; http://www.fhwa.dot.gov/pavement/concrete/pubs/hif10014/hif10014.pdf, pp. 1-4.
Open Source Ecology, [online]; [retrieved on Jan. 5, 2012]; retrieved from the Internet http://opensourceecology.org/wiki/Geopolymers, "Geopolymers," 4 pages.
P. Duxson et al "Geopolymer technology: the current state of the art", Journal of Material Science (2007) 42:2917-2933.
Geopolymer Institute, [online]; [retrieved on Jan. 5, 2012]; retrieved from the Internet http://www.geopolymer.org/science/introduction, "What is a geopolymer? Introduction", Geopolymer Institute, 1996-2011, 1 page.
Yenny Christanti et al., "A New Technique to Control Fines Migration in Poorly Consolidated Sandstones—Laboratory Development and Case Histories," SPE International, SPE 143947, Copyright 2011, Society of Petroleum Engineers, 1 page.

* cited by examiner

*Primary Examiner* — Zakiya W Bates
(74) *Attorney, Agent, or Firm* — Cantor Colburn LLP

(57) ABSTRACT

A method of reducing the presence of particles in a downhole environment, comprising contacting sediment particles contained in a downhole environment, with a composition comprising: a metallic composition, an inorganic oxide-based polymer, and a solvent; the contacting occurring in the presence of a fluid capable of decomposing the metallic composition.

24 Claims, No Drawings

METHOD OF CONTROLLING RESERVOIR PARTICLES USING ELECTROLYTIC COMPOSITE MATERIALS

CROSS REFERENCE TO RELATED APPLICATION

This application claims the benefit of an earlier filing date from U.S. Provisional Application Ser. No. 61/584,910 filed Jan. 10, 2012, the entire disclosure of which is incorporated herein by reference.

BACKGROUND

Downhole operations such as drilling, hydraulic fracturing typically result in the generation of particulate residue, frequently where the operations are carried out in rock formations that are not well consolidated. The presence of such particulates, such as sand, can interfere with extraction or filling of the drilled borehole or reservoir, since the particulates can clog or damage equipment, or can interfere with stimulation or extraction processes.

While equipment such as filters and screens may be used to reduce, collect, or minimize the amount of particulates in downhole environments, other methods have been considered such as injecting concrete compositions downhole to agglomerate the particulates into a porous mass that does not have to be filtered. Such methods are sometimes referred to as "screenless completion techniques" and involve injecting a consolidating fluid including, for example, a resin, curing agent, and catalyst and a wetting agent. Other methods include injecting a consolidating composition of colloidal particles such as silica, and a modifier to adjust pH or ionic strength to form a gel that prevents particulate mobility.

Geopolymers include inorganic polymers based on inexpensive mineral or mineral-derived materials such as silicas, silicates, aluminosilicates, etc. and are of interest because such materials can be cured by action of acid or alkali and form stable networks that provide a higher degree of strength and interconnectivity, and hence improved durability and longevity. For example, materials such as silicates including alkali-activated slags have been used as cements.

However, there remains a need for injectable materials that have improved control over consolidation and bulk properties in reducing particles after consolidation.

SUMMARY

The above and other deficiencies of the prior art are overcome by a method of reducing the presence of particles in a downhole environment, comprising contacting sediment particles contained in a downhole environment, with a composition comprising: a metallic composition, an inorganic oxide-based polymer, and a solvent; the contacting occurring in the presence of a fluid capable of decomposing the metallic composition.

In another embodiment, a method of reducing free particles in a downhole environment comprises injecting, into a downhole environment, a composition comprising: a metallic composition, an inorganic oxide-based polymer, and a solvent; the injecting occurring in the presence of a fluid capable of decomposing the metallic composition.

In another embodiment, a method of forming a cured material in a downhole environment comprises combining sedimentary particles, with a composition comprising a metallic composition, an inorganic oxide-based polymer, and a solvent, the combining occurring in the presence of a fluid capable of decomposing the metallic composition.

DETAILED DESCRIPTION

Disclosed herein is a method for controlling adventitious particulate matter found in downhole environments. Controlling the amount and prevalence of the particulates is accomplished by injecting an inorganic oxide based polymeric material having unique curing and compositional properties into a downhole environment. The inorganic oxide-based polymeric material is based on a composite of metallic composition comprising a magnesium alloy and an inorganic oxide-based polymer, such as silica. The inorganic oxide-based polymeric material, in the presence of a corrosive material including an electrolyte such as brine, an acid (aqueous hydrochloric acid and/or sulfuric acid, or the like) provides for a controlled decomposition of the magnesium alloy, and further provides a source of ionic materials such as magnesium hydroxide and aluminum oxides and hydroxides useful for catalyzing the condensation of the inorganic oxide-based polymer, and (in the case of aluminum species in the alloy for example) providing a source of reactant or cross-linking agent for forming an inorganically linked network structure. The resultant structure can be used in a variety of downhole applications including stabilizing the formation, agglomerating fine particles, or coating downhole equipment or the environment.

Thus, a method of reducing the presence of particles in a downhole environment comprises contacting sediment particles contained in a downhole environment, with an inorganic oxide-based polymer composition comprising: a magnesium alloy composition, an inorganic oxide-based polymer, and a solvent; the contacting occurring in the presence of a fluid capable of decomposing the magnesium alloy composition.

The inorganic oxide-based polymer composition includes a metallic composition, and an inorganic oxide-based polymer.

The metallic composition comprises a magnesium alloy. The magnesium alloy includes magnesium or any magnesium alloy which is dissolvable in a corrosive environment including those typically encountered downhole, such as an aqueous environment which includes formation water, seawater, salt (i.e., brine), completion brine, stimulation treatment fluid, remedial cleanup treatment fluid, or an acidic or corrosive agent such as hydrogen sulfide, hydrochloric acid, or other such corrosive agents, or combinations thereof. Magnesium alloys suitable for use include alloys of magnesium with aluminum (Al), cadmium (Cd), calcium (Ca), cobalt (Co), copper (Cu), iron (Fe), lithium (Li), manganese (Mn), nickel (Ni), potassium (K), silicon (Si), silver (Ag), sodium (Na), strontium (Sr), thorium (Th), tin (Sn), titanium (Ti), tungsten (W), zinc (Zn), zirconium (Zr), or a combination comprising at least one of the foregoing.

In another embodiment, the metallic composition comprises a calcium alloy. The calcium alloy includes calcium or any calcium alloy which is dissolvable in a corrosive environment including those typically encountered downhole, such as an aqueous environment which includes salt (i.e., brine), or an acidic or corrosive agent such as hydrogen sulfide, hydrochloric acid, or other such corrosive agents, or combinations thereof. Calcium alloys suitable for use include alloys of calcium with aluminum (Al), cadmium (Cd), cobalt (Co), copper (Cu), iron (Fe), lithium, (Li), magnesium (Mg), manganese (Mn), nickel (Ni), potassium, (K), silicon (Si), silver (Ag), sodium (Na), strontium (Sr), thorium (Th), tin (Sn), titanium, (Ti), tungsten (W), zinc (Zn), zirconium (Zr), or a combination comprising at least one of the foregoing. Alloying or trace elements can be included in varying amounts to adjust the corrosion rate of the calcium. For example, four of these elements (cadmium, magnesium, silver, and zinc) have to mild-to-moderate accelerating effects on corrosion rates, whereas four others (copper, cobalt, iron, and nickel) have a still greater effect on corrosion. Exemplary commercial calcium alloys which include different combinations of the above alloying elements to achieve different degrees of corrosion resistance include but are not limited to, for example, those alloyed with aluminum and silica, such as AL2013-T3 and AL2014-T2, available from Stanford Materials.

In an embodiment, the magnesium alloy or calcium alloy particles are coated with one or more layers. In one embodiment, these particles have a core-shell structure, in which the core comprises a magnesium alloy and the shell comprises an aluminum alloy. The shell layer is not identical to the core. The function of the shell is to affect the rate of the dissolution of the core material by accelerating or decelerating the rate based on the relative difference in galvanic potential between the core and shell.

In another embodiment, the metallic particles are coated. Useful coated metallic particles include those described in co-pending U.S. Patent Application Publication No. 2011/0135953 A1, filed on Dec. 8, 2009, and in co-pending U.S. patent application Ser. Nos. 13/220,824, 13/220,832 and 13/220,822 each filed on Aug. 30, 2011, each of which is incorporated herein by reference in its entirety. These applications describe coated metallic particles having nanoscale coatings (e.g., about 5 nm to about 2,500 nm) of Al, Zn, Zr, Mn, Mg, Mo, Ni, Ti, Fe, Cu, Si, Ca or Sn, or an oxide, carbide or nitride thereof, or a cermet thereof, or a combination of any of the aforementioned materials, wherein the coating layer has a chemical composition and the particle core has a chemical composition that is different than the chemical composition of the coating layer.

Alloys having corrosion rates different than those of the above exemplary alloys are also useful. For example, nickel has been found to be useful in decreasing the corrosion resistance (i.e., increasing the corrosion rate) of magnesium alloys when included in small amounts (i.e., less than 1% by weight). For example, the nickel content of a magnesium alloy is less than or equal to about 0.5 wt %, or less than or equal to about 0.4 wt %, or less than or equal to about 0.3 wt %, in some embodiments.

In an embodiment, the magnesium alloy is provided as a powder having a particle size of from about 5 nanometers (nm) to about 4 millimeters (mm), and more specifically about 10 nm to about 1 mm. The powder is further coated using a method such as chemical vapor deposition, physical vapor deposition, wet chemical deposition, electrochemical deposition, electroless deposition or the like, or admixed by physical method such cryo-milling, ball milling, or the like, with a metal or mixture of metals such as Al, Ca, Mg, Mn, Zn, Zr, Mo, Si, Re, Ni, W, Co, Cu, Fe, or oxides, carbides, nitrides of one of these metals, or a combination of any of the aforementioned materials, or the like.

In an embodiment, the magnesium alloy composition is a particle comprising a magnesium particle interdispersed with an aluminum-containing coating. As used herein, "inter-dispersed" mean that two or more adjacent layers (e.g., a core of a magnesium alloy and an aluminum coating) interpenetrate into or through each other in intimate admixture, where it will be appreciated that two (or more) inter-dispersed layers have, on average, a compositional gradient due to the interpenetration of one layer into the adjacent layer. The magnesium alloy has a corrosion rate of about 0.1 to about 200 mg/cm$^2$/hour, specifically about 1 to about 150 mg/cm$^2$/hour determined in aqueous 3 wt % KCl solution at 200° F. (93° C.).

The magnesium alloy composition further includes an oxide of one or more of the metals included in the magnesium alloy composition. For example, where the core comprises a magnesium-aluminum alloy, oxides of calcium (such as quicklime), magnesium (such as magnesia), aluminum (such as alumina), or a combination comprising at least one of the foregoing are present.

The inorganic oxide based composition further includes an inorganic oxide-based polymer. In an embodiment, the inorganic oxide-based polymer comprises a plurality of structural repeating units —(X—O)— where X is Si, Al, P, or a combination comprising at least one of the foregoing.

In an embodiment, useful inorganic oxide based polymers include structural repeating units including, for example, —Si—O—Si—O— (polysiloxo) chains, —Si—O—Al—O— (polysialate) chains, —Si—O—Al—O—Si—O— (polysialate-siloxo) chains, —Si—O—Al—O—Si—O—Si—O— (polysialate-disiloxo) chains, P—O—P—O— (polyphosphate) chains, —P—O—Si—O—P—O— (polyphosphate-phosphosiloxo) chains, —P—O—Si—O—Al—O—P—O (polyphosphosialate), —(R)—Si—O—Si—O—(R)— (polyorganosiloxo) chains, a combination comprising at least one of the foregoing. Exemplary inorganic oxide-based polymer includes, in some embodiments, silica, alumina, zirconia, phosphate, or a combination comprising at least one of the foregoing units. Typical such silica-containing materials include water glass, silica sol, fumed silica, clay, slag, zeolites, bauxite, fly ash, silicate minerals, aluminosilicate minerals, diatomaceous earth, or a combination comprising at least one of the foregoing. The inorganic oxide based polymer has a number averaged particle size of about 5 nm to about 10 mm.

Exemplary materials having such structures include silica-based water glass geopolymers, such as polysiloxonates including those that are substantially water soluble (i.e., having a solubility of greater than or equal to about 1% by weight); polysilalates such as kaolinite or hydrxoysodalite geopolymers having a 1:1 molar ratio of Si to Al; polysialate-siloxo geopolymers such as metakaolin MK-750 based geopolymers having a 2:1 molar ratio of Si to Al; calcium-based geopolymers (including Ca, N, and K) having an Si to Al ratio of 1, 2, or 3:1; rock-based geopolymers including polysialate-multisiloxo polymers having an Si to Al ratio of about 1:1 to about 1:10; silica-based geopolymers having siloxo and sialate linking groups in a polysiloxonate with an Si to Al ratio of about 10:1 or greater; fly-ash based geopolymers, derived from the combustion of silicate/aluminate containing materials such as impure coals; phosphate-based geopolymers; and organic-mineral-based geopolymers including synthetic hybrids of organic groups linking siloxo or silicate groups.

The inorganic oxide-based composition includes the magnesium alloy composition and the inorganic-oxide based polymer in a weight ratio of about 0.1:99.9 to about 99.9:0.1, in an embodiment, 1:99 to about 99:1, and in an embodiment, 10:90 to about 90:10 based on the total weight of magnesium alloy composition and inorganic-oxide based polymer.

The inorganic oxide-based polymer composition further includes a solvent. The solvent is aqueous or non-aqueous. In an embodiment, the solvent comprises water; alcohols including $C_{1-20}$ alcohols, diols, or polyols including methanol, ethanol, isopropanol, ethylene glycol, propylene glycol, glycerol, diethylene glycol, poly(ethylene glycol), poly(ethylene-propylene) glycol, and the like; surfactants; dispersants; water-miscible polar aprotic solvents such as dimethylsulfoxide, N,N-dimethylformamide, gamma butyrolactone, N-methylpyrrolidone, and the like; ionic liquids including those based on, for example, N,N-dialkylimidazolium salts; or a combination comprising at least one of the foregoing. The solvent where aqueous can be adjusted for pH by addition of, for example, mineral acids such as hydrochloric acid, sulfuric acid, and nitric acid; bases including sodium hydroxide, potassium hydroxide, magnesium hydroxide, calcium hydroxide, sodium carbonate, and the like; buffers including alkali salts of weak acids such as formic acid, acetic acid, citric acid, and the like, and sulfonic acids. In an embodiment, the composition is aqueous and has a pH of greater than about 6, in another embodiment, has a pH of greater than about 7, in another embodiment, has a pH greater than about 8, and in another embodiment, has a pH of greater than about 9. The aqueous fluid optionally contains an inorganic salt, such as NaCl, KCl, $CaCl_2$, $MgCl_2$, $CaBr_2$, $ZnBr_2$, NaBr, and the like, and a combination comprising at least one of the foregoing.

In an embodiment, the inorganic oxide-based composition comprises the magnesium alloy composition in an amount of about 0.1 to about 90 wt %, and the inorganic oxide-based polymer in an amount of about 0.1 to about 90 wt %, each based on the total weight of the composition.

Additional components can be utilized to improve the performance properties and range of applicability. For example, thickeners, curing agents, catalysts, retarders surfactants, thixotropic agents, extenders, fillers, weighting agents, defoamers, salts, additional solvents, and the like can also be included. In one non-limiting example the thixotropic agent is calcium sulfate.

In an embodiment, the composition is curable. It will be understood that cure of silicate and aluminate type materials includes the condensation of two silanol groups and/or aluminum hydroxide groups, or a combination silanol and aluminum hydroxide groups, to form a, M-O-M link, where M is Si, Al, P, etc. Because silicates have more than one silanol per monomeric unit, it is possible to form a cross-linked network material upon cure of silicates with one another. Furthermore, the action of the magnesium-aluminum alloy in the presence of downhole fluids such as brine, or acid, is one of controlled electrolysis based on the composition of the magnesium-aluminum composition. By this decomposition, aluminum oxides and hydroxides, or those of other metals present in the magnesium-aluminum alloy, are generated in the presence of the silica or silicates, and can act as cross-linkers and co-condensates with the silica. In an embodiment, the decomposition product is magnesium hydroxide, aluminum hydroxide, aluminum oxide, or a combination comprising at least one of the foregoing. Further, the presence of hydroxides generated by the electrolysis of the magnesium catalyzes the condensation of the silica-alumina precursor materials. In this way, the magnesium alloy composition acts as a compositional control with respect to aluminum content, and as a way of introducing a rate control based on the relative amount of magnesium-aluminum composition to inorganic oxide-based polymer.

Thus, a cured material comprises the cure product of the inorganic oxide-based composition. In an embodiment, the inorganic oxide-based composition comprises the cure product of a magnesium alloy composition, an inorganic oxide-based polymer, and a solvent, the cure product having a network structure. As used herein "network structure" means that collectively the silicate/aluminate/phosphate units form a branched, interconnected lattice structure. The structure can be solid, or template around inclusions such as pore-generating materials including salts that can be removed by washing, or porogens (such as poly(ethylene-co-propylene) polymers, cyclodextrins, and the like) which can be removed by thermal or chemical degradation and diffusion or removal of the degradation products to provide pores of controlled size in the polymer matrix. Porosity may be also formed by distribution of hydrogen gas generated from the magnesium-aluminum alloy decomposition. The composition is curable at temperatures of less than or equal to about 300° C., in an embodiment, less than or equal to 200° C., and in another embodiment, less than or equal to 100° C.

In an embodiment, the inorganic oxide-based polymer composition is injected into a downhole environment. Downhole environments including boreholes and fracture zones in reservoir rock, and particularly those which are found in unstable formations, include sedimentary particles, sometimes referred to as "fine particles" or simply "fines." Such sedimentary particles include particles of sand, fractured rock, or other pieces of fine grained material which are by products of the drilling process, of hydraulic fracturing, which are injected downhole as proppants, or which are present as adventitious materials.

The sedimentary particles possess reactive functionality such as silanol groups which can react with similar silanol, aluminum hydroxide, or phosphate groups in the inorganic oxide-based polymer, to form Si—O—Si, Si—O—Al, Si—O—P, or combinations of these linkages. Such a reaction is catalyzed by acid or base condensation. In an embodiment, the metal hydroxide decomposition product of the magnesium-aluminum composition thus catalyzes a condensation of the inorganic oxide-based polymer and the sediment particles. The sedimentary particles and inorganic oxide-based polymer further condense with metal hydroxide and/or metal oxide. In embodiments, the method is suitable for stabilizing sediment particles, where such sediment particles are fine particles having a number averaged particle size of less than about 100 micrometers, in an embodiment less than about 75 micrometers, and in another embodiment, less than about 50 micrometers.

In another embodiment, a method of reducing free particles in a downhole environment comprises injecting, into a downhole environment, a composition comprising: a magnesium alloy composition, an inorganic oxide-based polymer, and a solvent; the injecting occurring in the presence of a fluid capable of decomposing the magnesium alloy composition.

In another embodiment, a method of forming a cured material in a downhole environment comprises combining sedimentary particles with a composition comprising: a magnesium alloy composition, an inorganic oxide-based polymer, and a solvent, the combining occurring in the presence of a fluid capable of decomposing the magnesium alloy composition.

The inorganic oxide-based composition is thus useful for any application requiring a network structure, including, synthetic cement, or can provide porous media with a zeolite-like micro or nanostructure. In an embodiment, the cured material is a cement, coating, or fixation material.

While one or more embodiments have been described, modifications and substitutions may be made thereto without departing from the spirit and scope of the invention.

Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of reducing the presence of particles in a downhole environment, comprising:
   contacting sediment particles contained in a downhole environment, with
   a composition comprising:
     a metallic composition,
     an inorganic oxide-based polymer, the inorganic oxide-based polymer comprising a plurality of structural repeating units which comprise —(X—O)— where X is Si, Al, P, or a combination comprising at least one of the foregoing, and the inorganic oxide-based polymer having a number averaged particle size of about 5 nm to about 10 mm; and
     a solvent;
   the contacting occurring in the presence of a fluid capable of decomposing the metallic composition;
   wherein the metallic composition comprises magnesium alloy particles coated with one or more layers to adjust the decomposition rate of the magnesium alloy in the fluid,
   wherein the magnesium alloy particles comprise magnesium having a valence of zero alloyed with aluminum, cadmium, calcium, cobalt, copper, iron, lithium, manganese, nickel, potassium, silver, sodium, strontium, thorium, tin, titanium, tungsten, zinc, zirconium, or a combination comprising at least one of the foregoing; and
   wherein the magnesium alloy particles have a corrosion rate of about 0.1 to about 200 mg/cm$^2$/hour determined in aqueous 3 wt % KCl solution at 200° F.

2. The method of claim 1, wherein the metallic composition comprises a magnesium alloy particle coated with an aluminum-containing coating to adjust the decomposition rate of the magnesium alloy in the fluid.

3. The method of claim 1, wherein the fluid corrodes the metallic composition, and a decomposition product of the metallic composition comprises a metal hydroxide, metal oxide, or a combination comprising at least one of the foregoing.

4. The method of claim 3, wherein the metal hydroxide catalyzes a condensation of the inorganic oxide-based polymer and the particles.

5. The method of claim 4, wherein the particles and inorganic oxide-based polymer further condense with metal hydroxide and/or metal oxide.

6. The method of claim 3, wherein the decomposition product is magnesium hydroxide, aluminum hydroxide, aluminum oxide, or a combination comprising at least one of the foregoing.

7. The method of claim 1, wherein the sediment particles are fine particles having a number averaged particle size of less than about 100 micrometers.

8. The method of claim 1, wherein the polymer comprises water glass, silica sol, fumed silica, clay, slag, fly ash, silicate minerals, aluminosilicate minerals, diatomaceous earth, or a combination comprising at least one of the foregoing.

9. The method of claim 1, wherein the solvent comprises water, alcohol, water-miscible polar protic solvents, ionic liquids, or a combination comprising at least one of the foregoing.

10. The method of claim 1, wherein the composition is aqueous and has a pH of greater than 7.

11. The method of claim 1, comprising the metallic composition in an amount of about 0.1 to about 90 wt %, and the inorganic oxide-based polymer in an amount of about 0.1 to about 90 wt %, each based on the total weight of the composition.

12. The method of claim 1, wherein the metallic composition and the inorganic-oxide based polymer are present in a weight ratio of 0.1:99.9 to 99.9:0.1, based on the total weight of metallic composition and inorganic-oxide based polymer.

13. A cured downhole composition prepared by the method of claim 1.

14. The cured downhole composition of claim 13, wherein the cured material is a cement, coating, or fixation material.

15. The method of claim 1, wherein the magnesium alloy comprises greater than zero and less than 1 wt % of nickel.

16. The method of claim 1, wherein the magnesium alloy comprises greater than zero and less than or equal to about 0.5 wt. % of nickel.

17. The method of claim 1, wherein the coating has a thickness of about 5 nm to about 2,500 nm.

18. The method of claim 1, wherein the inorganic oxide-based polymer comprises a structural repeating unit which comprises —Si—O—Si—O— (polysiloxo) chains, —Si—O—Al—O— (polysialate) chains, —Si—O—Al—O—Si—O— (polysialate-siloxo) chains, —Si—O—Al—O—Si—O—Si—O— (polysialate-disiloxo) chains, P—O—P—O— (polyphosphate) chains, —P—O—Si—O—P—O— (polyphosphate-phosphosiloxo) chains, —P—O—Si—O—Al—O—P—O (polyphosphosialate) chains, —(R)—Si—O—Si—O—(R)— (polyorganosiloxo) chains, or a combination comprising at least one of the foregoing.

19. The method of claim 1, wherein the metallic composition and the inorganic-oxide based polymer are present in a weight ratio of 10:90 to 90:10, based on the total weight of metallic composition and inorganic-oxide based polymer.

20. The method of claim 1, wherein the sedimentary particles possess a functionality, which is reactive with the inorganic oxide-based polymer.

21. The method of claim 20, wherein the functionality comprises silanol groups.

22. The method of claim 1, wherein the magnesium alloy comprises a powder having a particle size of from about 5 nanometers to about 4 millimeters.

23. A method of reducing free particles in a downhole environment, comprising:
   injecting, into a downhole environment,
      a composition comprising:
         a metallic composition,
         an inorganic oxide-based polymer, the inorganic oxide-based polymer comprising a plurality of structural repeating units which comprise —(X—O)— where X is Si, Al, P, or a combination comprising at least one of the foregoing, and the inorganic oxide-based polymer having a number averaged particle size of about 5 nm to about 10 mm; and
         a solvent;
      the injecting occurring in the presence of a fluid capable of decomposing the metallic composition;
         wherein the metallic composition comprises magnesium alloy particles coated with one or more layers to adjust the decomposition rate of the magnesium alloy in the fluid,
         wherein the magnesium alloy particles comprise magnesium having a valence of zero alloyed with aluminum, cadmium, calcium, cobalt, copper, iron, lithium, manganese, nickel, potassium, silver, sodium, strontium, thorium, tin, titanium, tungsten, zinc, zirconium, or a combination comprising at least one of the foregoing; and
         wherein the magnesium alloy particles have a corrosion rate of about 0.1 to about 200 mg/cm$^2$/hour determined in aqueous 3 wt % KCl solution at 200° F.

24. A method of forming a cured material in a downhole environment, comprising:
   combining sedimentary particles, with
      a composition comprising:
         a metallic composition,
         an inorganic oxide-based polymer, the inorganic oxide-based polymer comprising a plurality of structural repeating units which comprise —(X—O)— where X is Si, Al, P, or a combination comprising at least one of the foregoing, and the inorganic oxide-based polymer having a number averaged particle size of about 5 nm to about 10 mm; and
         a solvent;
      the combining occurring in the presence of a fluid capable of decomposing the metallic composition;
         wherein the metallic composition comprises magnesium alloy particles coated with one or more layers to adjust the decomposition rate of the magnesium alloy in the fluid,
         wherein the magnesium alloy particles comprise magnesium having a valence of zero alloyed with aluminum, cadmium, calcium, cobalt, copper, iron, lithium, manganese, nickel, potassium, silver, sodium, strontium, thorium, tin, titanium, tungsten, zinc, zirconium, or a combination comprising at least one of the foregoing; and
         wherein the magnesium alloy particles have a corrosion rate of about 0.1 to about 200 mg/cm$^2$/hour determined in aqueous 3 wt % KCl solution at 200° F.

* * * * *